(12) United States Patent
Westerman

(10) Patent No.: US 7,076,118 B1
(45) Date of Patent: Jul. 11, 2006

(54) DOCUMENT CLASSIFICATION SYSTEM

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1270 days.

(21) Appl. No.: 08/985,576

(22) Filed: Dec. 5, 1997

(51) Int. Cl.
*G06K 9/54* (2006.01)

(52) U.S. Cl. .................. 382/305; 345/157; 345/158; 351/208; 351/209; 382/103; 382/107

(58) Field of Classification Search .............. 396/51; 382/103, 107, 173, 305; 345/156–157, 158; 351/208, 209
See application file for complete search history.

(56) References Cited

U.S. PATENT DOCUMENTS

| | | | |
|---|---|---|---|
| 5,231,674 A | 7/1993 | Cleveland et al. | 382/6 |
| 5,245,381 A | 9/1993 | Takagi et al. | 354/471 |
| 5,253,008 A | 10/1993 | Konishi et al. | 354/402 |
| 5,293,427 A * | 3/1994 | Ueno et al. | 382/103 |
| 5,333,029 A | 7/1994 | Uchiyama et al. | 354/410 |
| 5,471,542 A * | 11/1995 | Ragland | 382/128 |
| 5,481,622 A * | 1/1996 | Gerhardt et al. | 382/103 |
| 5,583,795 A | 12/1996 | Smyth | 364/516.444 |
| 5,623,703 A | 4/1997 | Takagi et al. | 396/51 |
| 5,627,586 A * | 5/1997 | Yamasaki | 348/169 |
| 5,818,954 A * | 10/1998 | Tomono et al. | 382/115 |
| 5,857,120 A * | 1/1999 | Konishi | 396/51 |
| 5,857,121 A * | 1/1999 | Arai et al. | 396/51 |
| 5,912,721 A * | 6/1999 | Yamaguchi et al. | 351/210 |
| 6,111,580 A * | 8/2000 | Kazama et al. | 715/863 |
| 6,120,461 A * | 9/2000 | Smyth | 600/558 |
| 6,243,076 B1 * | 6/2001 | Hatfield | 345/156 |
| 6,433,759 B1 * | 8/2002 | Richardson et al. | 345/7 |
| 6,578,962 B1 * | 6/2003 | Amir et al. | 351/209 |
| 6,611,283 B1 * | 8/2003 | Isonuma | 348/51 |
| 6,634,749 B1 * | 10/2003 | Morrison et al. | 351/209 |

OTHER PUBLICATIONS

"Indexing pictorial documents by their content: a survey of current techniques"; Rome, Italy, Apr. 22, 1996; 23 pages.
"Automatic object identification and analysis of eye movement recordings"; Mar. 2, 1997; Berlin, Germany; 8 pages.
"New Technological Windows into Mind: There is More in Eyes and Brains for Human-Computer Interaction"; by Velichkovsky & Hansen; Germany & Denmark; 11 pages.

* cited by examiner

*Primary Examiner*—Matthew C. Bella
*Assistant Examiner*—Gregory Desire
(74) *Attorney, Agent, or Firm*—Chernoff, Vilhauser, McClung & Stenzel

(57) ABSTRACT

An image system with an imaging device obtains and presents at least one image. An eye gaze system associated with the imaging device determines a non-closed loop portion of the at least one image that an eye of a viewer observes. The image system associates the at least one image with the non-closed loop portion of the at least one image. An image processor analyzes the image based at least in part on the image itself together with data representative of the gaze information to determine the content of the image, where the gaze information is a non-closed loop portion of the image that an eye of a viewer observes. The image system associates the content with the image.

35 Claims, 2 Drawing Sheets

DOCUMENT CLASSIFICATION SYSTEM

BACKGROUND OF THE INVENTION

The present invention relates to an improved document classification system, and in particular to a document classification system that incorporates eye gaze information.

In traditional information management systems a document was considered a homogeneous set of data to be stored and retrieved as a single unit. Nevertheless, as the need arose to use the same information in different environments and in different cognitive contexts, the concept of the document has evolved. For example, typical medical documents are composed of anagraphic data, anamnesis (past medical history), reports, and images. Each of the different portions of such medical documents may need to be queried differently. For example, a general physician might consider the whole document as a specific patient description, and therefore ask for comments linked to a given person's name. On the other hand, a specialist might focus on classes of diagnosis from radiologic exams and might want to formulate a related query for images with analogous pathological contents. Accordingly, many document retrieval and identification systems need to be capable of searching documents that include text, images, and structured data.

The primary problem in automated document management is properly indexing all of the documents. Indexing involves assigning to each document, or portion of a document, a synthetic descriptor facilitating its retrieval. The assignment of such a descriptor is generally performed by the steps of: (1) extracting relevant entities or characteristics as index keys; (2) choosing a representation for the keys; and (3) assigning a specific meaning to the keys. A detailed description of such indexing is described in Marsicoi, et al., Indexing pictorial documents by their content: a survey of current techniques: Image and Vision Computing, 15 (1997), pp. 119–141, incorporated by reference herein.

Images deserve special attention within a document management system because of the difficulty of addressing the content of an image using traditional textual query languages and indices. Images are no longer considered as pure communication objects or appendices of a textual document, but rather images are now considered self-describing entities that contain related information (content) that can be extracted directly from the image. For this reason, prior to storing an image in a database, a description activity is performed to process the image, analyze its contents, interpret its contents, and classify the results. Accordingly, the need arises to develop systems to allow content-based image extraction and retrieval.

Textual entities are readily extracted from documents by automated systems and stored in a database for later use. In contrast, it is difficult to formulate rules for the identification of relevant objects to be extracted from images. This difficulty is partly a result of the multitude of factors influencing the image acquisition, namely, instrumentation tuning and precision, sampling, resolution, visual perspective, and lighting. All of these factors introduce noise in the visual rendering of pictorial objects which modify their morphological and geometric characteristics. Further, objects from a natural scene show a high degree of variation in their characteristics. For example, while it might be easy to define a set of rules that identify a pattern of pixels representing a circle, the task is much more difficult to define a set of rules to detect a pattern of pixels representing a tree. This increased difficulty necessitates the adoption of image analysis systems based on the general similarity of a known object, as opposed to an exact match of a known object.

A typical image analysis system first identifies and extracts objects from an image and then represents their relations. Spatial entities can be represented in many complimentary ways depending on the task requirements. For example, the same object may be represented by the chain code of its contour, by the minimum rectangle enclosing it, by a set of rectangles covering its area, or by related graphs.

Once the image analysis system has represented the object, the objects and spatial relations from the image are classified, i.e. associated with real object features, and described according to the observer's interest. Image classification is not unique in that the same pictorial entity can be classified to different real objects. For example, a circular shape can be interpreted as a wheel, a ball, or a disk. Whether this level of semantic discrimination is necessary depends on the informative context. Although image classification and derived indexing methods are not unique, they can be effective for specific applications where the pictorial entities are well-defined. However, general indexing for images is much harder and as yet an unsolved problem.

FIG. 1 shows a typical document management system 10 in which a user 20 formulates his information retrieval request 12 as a query 14 in a query language. The query 14 is received by a matching system 16 that matches it against documents in a document database 18. Documents containing relevant data are retrieved and forwarded to the user 20.

The primary goal of the document management system 10 is to easily, efficiently, and effectively retrieve from the database 18 documents relevant to a certain user's need. This requires the system to have a meaningful indexing scheme for all documents. In the case of images, a meaningful indexing scheme means that the extracted information from an image should be related to the represented pictorial entities (objects), to their characteristics, and their relations.

The indices representing image content may be a textual string obtained by manual annotation or by an automatic analysis module. In the latter case, many of the approaches to indexing require pattern recognition techniques.

The automatic analysis of image content requires the design of efficient and reliable segmentation procedures. In applications such as mechanical blueprints, there are features that are exactly defined and easily recognizable. In contrast, natural images have few features that are easily identifiable. Accordingly, present algorithms are only capable of effectively dealing with limited classes of images. In particular, they work with a small number of non-overlapping objects on an easily identifiable and separable background, and in general require knowledge of the lighting conditions, of the acquisition devices, and of the object context and its features.

One analysis technique used to extract information from an image is to perform interactive segmentation by providing semi-automatic object outlining. The user assists the system by indicating with a pointer or box the exterior contour of the object of interest. Alternatively, the system may use edge pixels having a high color gradient (not necessarily identifying the complete contour of an object) which are matched with known edge patterns from a database. In either case, the outline of the object must be identified for the system. In particular, this requires a closed loop area and not merely a general region of the image where the object is located.

There exist many automatic techniques for analyzing pictorial images to extract relevant information therefrom. Some of the techniques may be grouped as color histograms, texture identification, shape identification, and spatial relations. The color histogram technique determines the predominant colors. For example, a predominant green color may be a lawn or forest, and a predominant blue color may be an ocean (if within the lower portion of the image) or a sky (if within the upper portion of the image).

The texture extract technique is used to extract relevant information from an image based on the texture of the image which is normally its frequency content. Typically, the frequency content of the image is obtained from its power spectrum density which is computed by a Fourier transform. The texture pattern is matched against known texture patterns to identify objects.

The shape identification technique is used to extract relevant information from an image. Shape identification typically uses either a function identifying a closed loop contour of an object or a closed loop edge identification of an image, and therefore matching the closed loop contour or edge to known objects. This technique may be used, for example, to identify faces which are generally round. Unfortunately, it is difficult to distinguish between features with similar shapes, such as distinguishing faces from clocks.

The spatial relations technique is used to extract relevant information to match a pattern. Such a spatial relation may be, for example, a tank within the image.

Any of the aforementioned techniques may be used in combination and further may include a prediction of where to expect to find particular features. For example, the document management system may expect to locate circular faces on the upper center portion of the image, and may expect to locate blue sky on the upper portion of the image.

The aforementioned systems are mechanical in nature and require mathematical mechanistic processing of each image to extract information that is then compared to a large number of possibilities in order to identify image content. While it is possible to supplement the aforementioned mechanistic system with the assistance of a person identifying closed loop outlines of images, or identifying the nature of the image with textual entries, this becomes a burdensome task, especially if a large number of images are involved. Further for complex images, these techniques often result in poor results because the specific element of interest in the image may not be a dominant contributor to the overall color, texture, shape, and spatial relations.

What is desired, therefore, is a technique for image identification that increases the likelihood of identifying the content of an image while reducing the processing required for such identification.

BRIEF SUMMARY OF THE INVENTION

The present invention overcomes the aforementioned drawbacks of the prior art by providing an image system with an imaging device that obtains and presents at least one image. An eye gaze system associated with the imaging device determines a non-closed loop portion of the at least one image that an eye of a viewer observes. The image system associates the at least one image with the non-closed loop portion of the at least one image.

The eye of the person obtaining the image is naturally drawn toward the important portion of the image. This occurs whether or not the person is trained to concentrate his gaze on the important aspect of the image or not. The gaze information of the viewer is maintained together with the image which provides a key additional piece of data for the processing of the image to identify the important aspects of the image.

In another aspect of the present invention an image processor analyzes the image based at least in part on the image itself together with data representative of the gaze information to determine the content of the image, where the gaze information is a non-closed loop portion of the image that an eye of a viewer observes. The image system associates the content with the image.

Preferably the non-closed loop portion is transformed into a closed loop portion of the image and the image processor analyzes the image based at least in part on the image itself together with the closed loop portion to determine the content of the image. Identification of the important region of the image permits focusing the image processor on those portions thereby reducing the computational requirements of the system.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
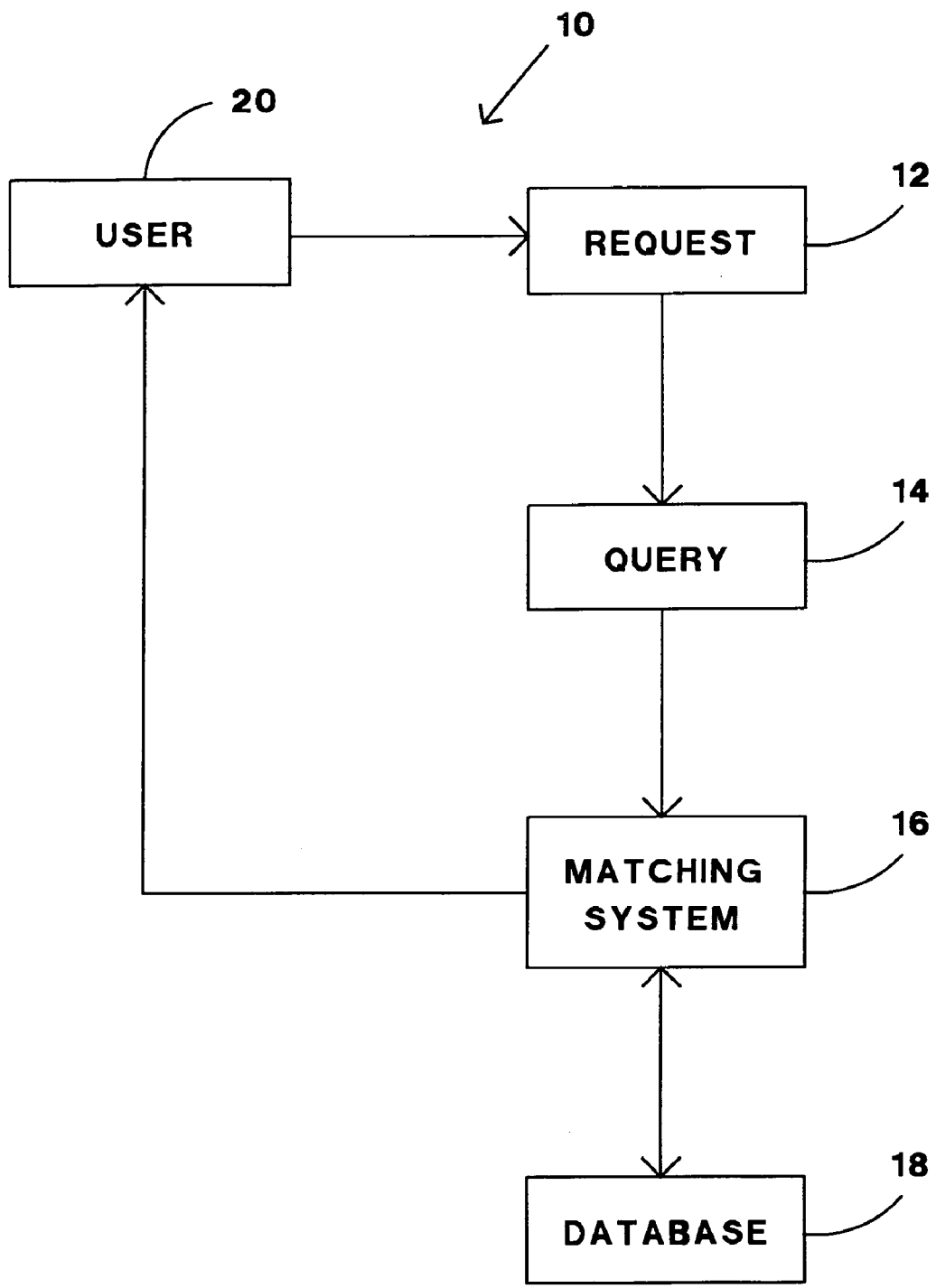
FIG. 1 is a block diagram of a document management system.

Existing techniques for the identification of image content are based on the premise that with sufficiently complex and innovative algorithms, together with unlimited computer resources, the image itself can be processed to determine its content. The image processing may also be supplemented with factors influencing the image acquisition itself, such as, lighting conditions and device settings. Unfortunately, existing systems are not capable of reliably identifying which aspects of the image content are important. Further, existing systems are not capable of taking into account the aesthetic quality of an image. In response to the aforementioned limitations, as previously discussed, some existing systems supplement the analysis of image content by additional manual identification of important features of the image with a closed loop path, which is time consuming and expensive.

In contrast to existing systems, the present inventor came to the realization that the eye gaze of the user viewing the image is naturally drawn toward the aesthetically important portion of the image. For example, when obtaining an image with a camcorder or camera the gaze of the user tends to be drawn to the image portion that the particular user considers the most important region of the image. This occurs whether or not the user is trained to concentrate his gaze on the important aspects of the image. For example, in a scene consisting of primarily grass together with a tiger standing at the upper left portion of the scene, the user's gaze will most likely be directed toward the tiger. The user's gaze information is the general region of interest that the viewer's gaze is observing, as opposed to a closed loop region of an object within the image.

In contrast to existing systems that only use the content of the image itself to determine its content, the present inventor realized that gaze information can be obtained and used together with the content of the image to provide key additional data for improved processing of the image. For example, when obtaining an image with a camera (still or video) the user naturally gazes at the aesthetically important aspect or at the region of particular interest within the image. The gaze information is either stored with the image or associated with the image if stored elsewhere.

Gaze information refers preferably to that portion of the image that the user primarily views while viewing the image. Alternatively, the gaze information may be any portion of the image viewed. The gaze information may be a single point or a series of points within the image. Alternatively, the gaze information may relate to one or more regions within the image. The gaze information is preferably obtained substantially contemporaneously with obtaining the image. Alternatively, the gaze information may be obtained later by presenting an image to a user for viewing. Since the gaze information refers to a point(s) and/or a region(s) of the image, it is not defined by a closed loop outline drawn by the user of an object of particular interest, as in prior art systems.

The eye gaze information may be recorded as a system of weights of points or regions of the image, or the gaze information may be used as the basis to identify a region of the image for further analysis to determine its content.

Alternatively, the gaze information may be used to define a closed loop portion of the image for further analysis, such as identifying a polygonal region around the gaze region(s).

The image processing system which determines the content of the image may include any of the previous systems together with the gaze information. The gaze information is used to identify those portions of an image that are of particular interest or of aesthetic quality to the user. This identification permits the system to focus processing on particular portions of an image. Accordingly, those portions distant from the gaze area may be discarded, if desired, as not being of particular interest in classifying the contents of the image.

An Advanced Photo System (APS) camera uses a film that includes a generally transparent thin layer of magnetic material over either a portion of or all of the film. The magnetic material is suitable to encode digital information therein. Traditionally, the magnetic material records conditions that exist when the photo was taken, such as lighting and camera settings (speed, shutter speed, aperture, time of day, date), that are used to improve the quality of subsequent film developing. All of these conditions that are recorded are suitable for optimization of subsequent image development and not primarily concerned with the analysis and categorization of the content of the image. The camera of the present invention further includes an eye gaze system which determines the portion of the image the user gazes at.

Other suitable still cameras (analog or digital) and video cameras (analog or digital) may likewise be used. For example, a digital camcorder and a digital camera may include an eye gaze system that stores the gaze information digitally on the video or the film, respectively. Other examples may include traditional film based cameras and analog video cameras where the gaze information is stored on the film or video, respectively. Alternatively, the gaze information for any type of image acquisition device may be recorded on any suitable format and location for later use by the image analysis system.

Figure 2:
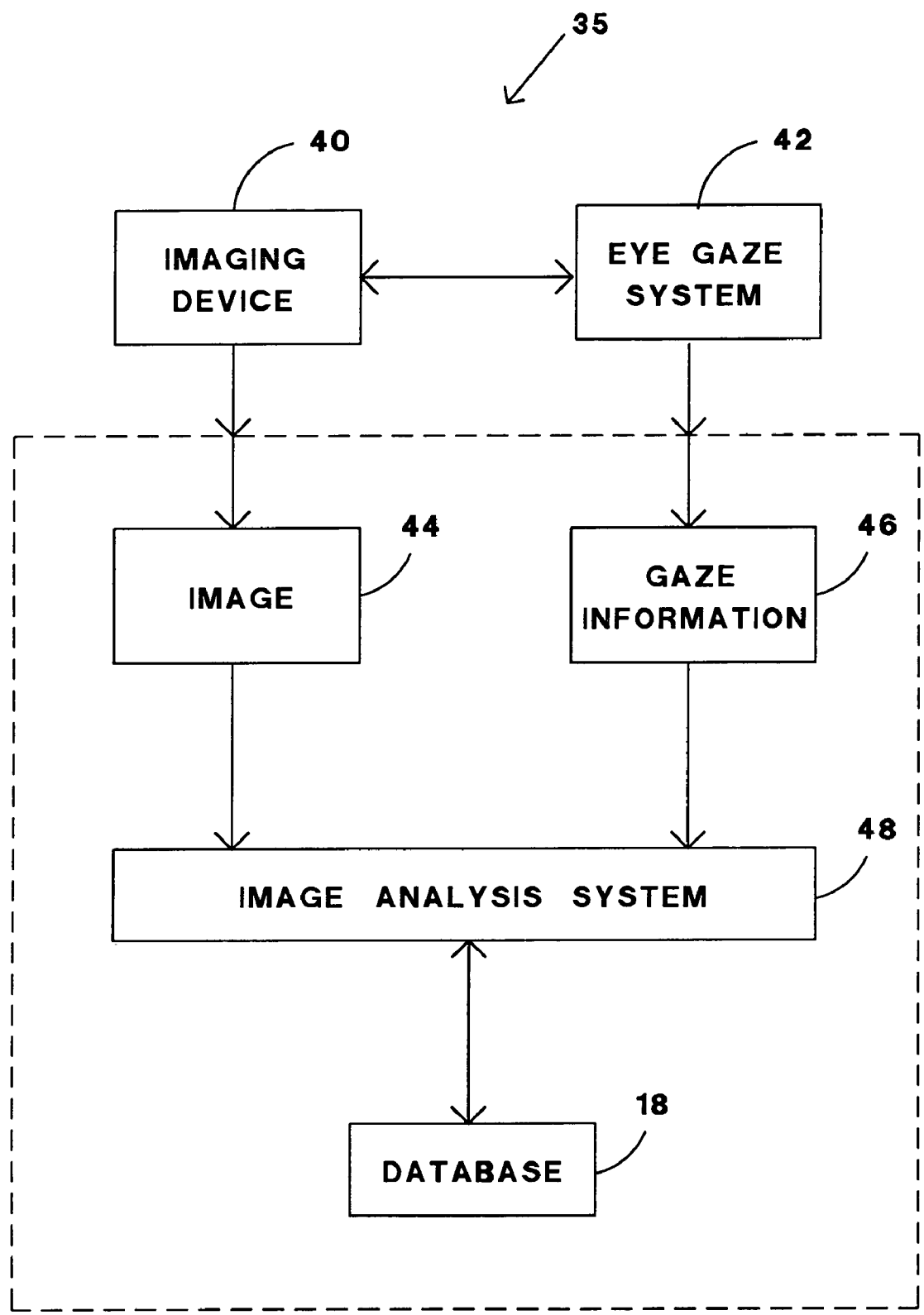
FIG. 2 is a block diagram of an exemplary embodiment of an image analysis system including an eye gaze system of the present invention.

Referring to FIG. 2, an eye gaze system 42, as previously described, includes an imaging device 40 together with an eye gaze system 42. The eye gaze system 42 is preferably integral with the imaging device 40. The image 44 from the imaging device 40 and gaze information 46 from the eye gaze system 42 are processed by an image analysis system 48. The image analysis system 48 may use any suitable image analysis techniques that further incorporate eye gaze information, as previously described. The results of the image analysis system 48 are stored in the database 18 for later retrieval.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. An image system comprising:
    (a) an imaging device that at least one of obtains and presents at least one image;
    (b) an eye gaze system associated with said imaging device that determines a non-closed loop portion including multiple points of said at least one image that an eye of a viewer observes wherein said viewer observes each of said multiple points; and
    (c) said image system associating said at least one image with said each of said multiple points of said non-closed loop portion of said at least one image.

2. The image system of claim 1 wherein said imaging device is at least one of a film based still camera, a film based video camera, a digital based still camera, and a digital based video camera.

3. The imaging system of claim 1 wherein said imaging device presents said at least one image to said user at a time subsequent to recording said image.

4. The imaging system of claim 1 wherein said eye gaze system is integral with said imaging device.

5. The imaging system of claim 1 wherein said non-closed loop portion is within said at least one image.

6. The imaging system of claim 1 wherein said non-closed loop portion is a region of said image.

7. The imaging system of claim 1 wherein said image system associating is storing said non-closed loop portion on a recording media of said imaging device.

8. The imaging system of claim 1 wherein said non-closed loop portion is used is the basis to define a closed-loop portion of said at least one image.

9. The imaging system of claim 1 wherein said at least one image is said obtained substantially contemporaneously with said non-closed loop portion.

10. The imaging system of claim 1 further comprising an image processor that identifies the content of said at least one image based on the content of the image together with said non-closed loop portion.

11. An image system comprising:
    (a) an image processor which analyzes an image based at least in part on said image itself together with data representative of gaze information to determine the content of said image, where said gaze information is a non-closed loop portion including multiple points of said image that an eye of a view observes wherein said viewer observes each of said multiple points; and
    (b) said imaging system associating said content, determined based at least in part upon said multiple points with said image.

12. The image system of claim 11 wherein said gaze information is transformed into a closed loop portion of said image and said image processor analyzes said image based at least in part on said image itself together with said closed loop portion to determine the content of said image.

13. The imaging system of claim 11 wherein said non-closed loop portion is within said at least one image.

14. The imaging system of claim 11 wherein said non-closed loop portion is a point within said at least one image.

15. The imaging system of claim 11 wherein said non-closed loop portion is a region of said image.

16. The imaging system of claim 11 wherein said image processor includes at least one of shape identification, texture identification, color identification, and spatial identification.

17. The imaging system of claim 11 further comprising storing said content in a database.

18. An imaging system comprising:
(a) an imaging device that at least one of obtains and presents at least one image;
(b) an eye gaze system associated with said imaging device that determines a non-closed loop portion including multiple points of said at least one image that an eye of a viewer observes wherein said viewer observes each of said multiple points;
(c) said image system associating said at least one image with said each of said multiple points of said non-closed loop portion of said at least one image; and
(d) said imaging device is at least one of a film based still image camera and a digital based still image camera.

19. The imaging system of claim 18 wherein said eye gaze system is integral with said imaging device.

20. The imaging system of claim 18 wherein said non-closed loop portion is within said at least one image.

21. The imaging system of claim 18 wherein said non-closed loop portion is a point within said at least one image.

22. The imaging system of claim 18 wherein said non-closed loop portion is a region of said image.

23. The imaging system of claim 18 wherein said image system associating is storing said non-closed loop portion on a recording media of said imaging device.

24. The imaging system of claim 18 wherein said non-closed loop portion is used as the basis to define a closed-loop portion of said at least one image.

25. The imaging system of claim 18 wherein said at least one image is said obtained substantially contemporaneously with said non-closed loop portion.

26. The imaging system of claim 18 further comprising an image processor that identifies the content of said at least one image based on the content of the image together with non-closed loop portion.

27. An imaging system comprising:
(a) an imaging device that at least one of obtains and presents at least one image;
(b) an eye gaze system associated with said imaging device that determines a non-closed loop portion including multiple points of said at least one image that an eye of a viewer observes wherein said viewer observes each of said multiple points;
(c) said image system associating said at least one image with said each of said multiple points of said non-closed loop portion of said at least one image; and
(d) an image processor that identifies the content represented by said at least one image based on the content of the image together with said non-closed loop portion.

28. The image system of claim 27 wherein said imaging device is at least one of a film based still camera, a film based video camera, a digital based still camera, and a digital based video camera.

29. The imaging system of claim 27 wherein said eye gaze system is integral with said imaging device.

30. The imaging system of claim 27 wherein said non-closed loop portion is within said at least one image.

31. The imaging system of claim 27 wherein said non-closed loop portion is a point within said at least one image.

32. The imaging system of claim 27 wherein said non-closed loop portion is a region of said image.

33. The imaging system of claim 27 wherein said image system associating is storing said non-closed loop portion on recording media of said imaging device.

34. The imaging system of claim 27 wherein said non-closed loop portion is used at the basis to define a closed-loop portion of said at least one image.

35. The imaging system of claim 27 wherein said at least one image is said obtained substantially contemporaneously with said non-closed loop portion.

* * * * *